United States Patent [19]

Tobita

[11] Patent Number: 5,761,171
[45] Date of Patent: Jun. 2, 1998

[54] GENERATING DATA DETECTING THRESHOLD LEVELS FROM REFERENCE PATTERNS RECORDED IN AN OPTICAL DISK, SUCH AS A MAGNETO-OPTICAL DISK

[75] Inventor: Minoru Tobita, Tokyo, Japan

[73] Assignee: Sony Corporation, Tokyo, Japan

[21] Appl. No.: 546,173

[22] Filed: Oct. 20, 1995

[30] Foreign Application Priority Data

Oct. 24, 1994 [JP] Japan ............... 6-258281

[51] Int. Cl.[6] ............... G11B 7/00
[52] U.S. Cl. ............... 369/59; 369/50; 369/48; 369/13
[58] Field of Search ............... 369/59, 58, 54, 369/53, 47, 48, 49, 50, 60, 32, 124, 13; 360/48, 51, 53, 46

[56] References Cited

U.S. PATENT DOCUMENTS 5,255,127 10/1993 Nakatsu et al. ............... 360/39 X
5,363,352 11/1994 Tobita et al. .
5,508,993 4/1996 Hagashi et al. ............... 369/59 X

FOREIGN PATENT DOCUMENTS

A-0 283 017 9/1988 European Pat. Off. .
A-0 544 017 6/1993 European Pat. Off. .
A-0-575 963 12/1993 European Pat. Off. .

*Primary Examiner*—Muhammad N. Edun
*Attorney, Agent, or Firm*—Frommer Lawrence & Haug LLP; William S. Frommer

[57] ABSTRACT

An optical disk, such as a magneto-optical disk, has data recorded in a spiral track or in concentric tracks which contain a reference pattern repeated in each of n blocks. The reference pattern of a block exhibits distinct amplitude levels from which are derived plural threshold levels that are used during a playback operation to detect reproduced data values. The levels of the reference pattern in each of the n blocks are sampled and used to produce at least two (e.g., higher and lower) threshold levels against which the data reproduced from the disk is compared to detect the values of such data.

47 Claims, 15 Drawing Sheets

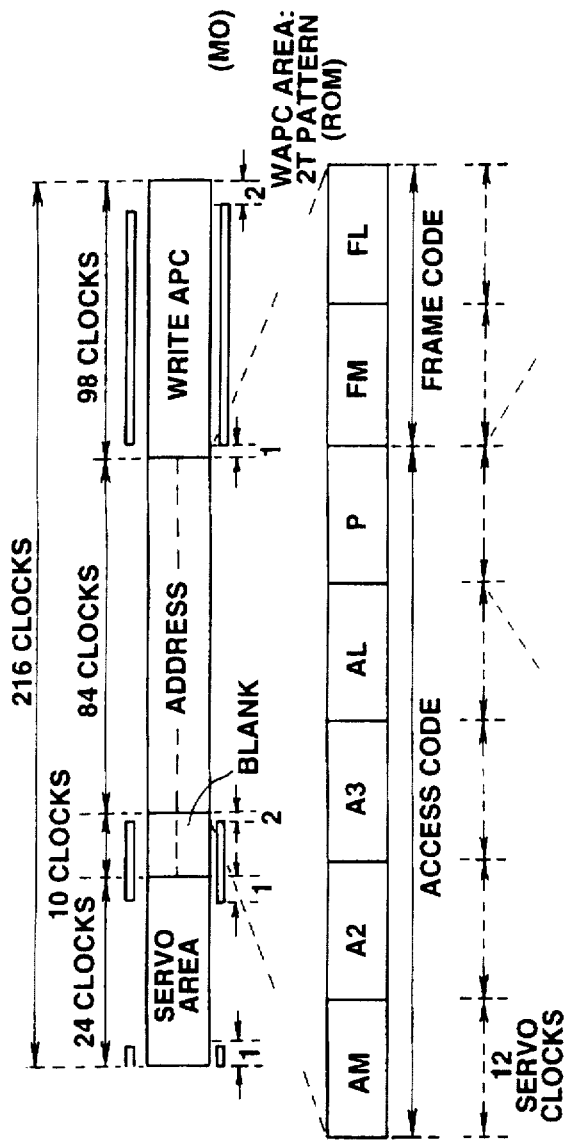
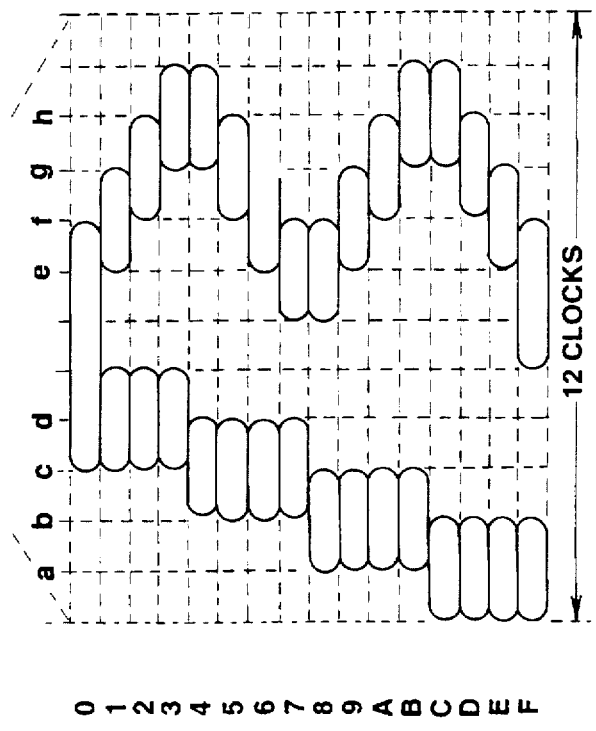
FIG.4A
FIG.4B
FIG.4C

$Eha0 = s0 - s2$
$Eha1 = s1 - s3$
$Eha2 = s2 - s4$

HA0~3   DEFECT CONDITION
abs(HA0-HA1)>EHA/2

GENERATING DATA DETECTING THRESHOLD LEVELS FROM REFERENCE PATTERNS RECORDED IN AN OPTICAL DISK, SUCH AS A MAGNETO-OPTICAL DISK

BACKGROUND OF THE INVENTION

This invention relates to a technique for generating threshold levels to be used in detecting data reproduced from an optical disk, preferably a magneto-optical disk, and more particularly, to a method and apparatus for recording and reproducing reference patterns from which those threshold levels are generated.

Optical disks are recorded with a spiral track or with concentric tracks in which information is represented by pits. Such disks are driven either at a constant angular velocity (CAV), whereby the density of the pits generally decreases at those tracks located at a greater radius from the center, or at a constant linear velocity (CLV), whereby the rotary speed of the disk increases as the radius of the track being scanned increases such that the density of the pits generally is constant over the entire disk.

The information recorded on an optical disk generally includes useful information, such as audio information for an audio disk, video and video/audio information for a video disk and computer file data for a computer disk (such as a CD ROM). In addition to such useful information, optical disks include address information to permit a user to access a desired portion of the disk, such as a desired data sector, and servo information which is used for tracking control (i.e. to assure "center-line" tracking of a recording or pickup head) and to synchronize the clock of the disk drive with the actual speed of the disk. Servo information may be recorded in a pre-existing groove that is formed continuously along the track of a spiral-track optical disk or, alternatively, the servo information may be distributed along the spiral or concentric tracks in discrete servo areas. For example, when manufacturing the optical disk, such discrete servo areas may be pre-formed as part of the manufacturing process.

When reproducing information from an optical disk, whether that disk is a playback-only (or read-only) disk, a write-once disk, a recordable disk (such as a magneto-optical disk) or a hybrid disk having read-only and recordable areas, the amplitude as well as the offset (as used herein, "offset" refers to the difference between maximum and minimum levels of the reproduced signals, or the center or "zero" level of the reproduced signals) may fluctuate because of fluctuations inherent in the optical system. Such optical system fluctuations are attributed to fluctuations in the disk speed, fluctuations occasioned by variations or changes in circuit parameters or fluctuations due to changes in the reflectance or other optical properties of the recording medium or changes in the Kerr rotation angle. While fluctuations in circuit parameters, for example, from one disk drive to another, can be compensated by performing suitable gain adjustments as part of the disk drive manufacturing operation, such "factory adjustments" are time consuming, require the skill of technical experts and often are not completely successful. Generally, such factory adjustments are not helpful in eliminating drive-to-drive fluctuations in the reflectance or optical properties of the recording medium or in changes in the Kerr rotation angle. Additionally, variations in the amplitude of the reproduced signals that may be caused simply by age of the disk drive, or amplitude variations due to small defects in the recording medium or due to the presence of dust or dirt on the recording medium certainly cannot be compensated or even predicted by factory adjustments.

It is important, therefore, to provide a dynamic technique for detecting the amplitude of data recorded on an optical disk, such as a magneto-optical disk, even though the signal levels reproduced from such data may change, or may be subject to fluctuations from the nominal factory pre-set values thereof.

OBJECTS OF THE INVENTION

Therefore, it is an object of the present invention to provide an improved technique for recovering data from an optical disk, such as a magneto-optical disk, notwithstanding fluctuations in the operating parameters of the disk or the disk drive that is used to play that disk.

Another object of this invention is to provide a technique for generating threshold levels from reference information recorded on the optical disk, these threshold levels being used to recover useful data reproduced from the disk.

A further object of this invention is to record a periodic reference pattern on the disk and to produce data-detecting threshold levels from samples of that reference pattern.

Various other objects, advantages and features of the present invention will become readily apparent from the ensuing detailed description, and the novel features will be particularly pointed out in the appended claims.

SUMMARY OF THE INVENTION

In accordance with this invention, a method and apparatus are provided for reproducing data from an optical disk, such as a magneto-optical disk, the data being recorded in a track which contains a reference pattern repeated in each of n blocks and exhibiting distinct amplitude levels from which are derived plural threshold levels that are used to detect the reproduced data values. The levels of the reference patterns in each of the n blocks are sampled and the sampled levels are used to produce plural threshold levels against which the reproduced data is compared in order to detect the value thereof.

This invention also relates to the recording of information in a spiral track or in concentric tracks on a magneto-optical disk, with each track containing plural sectors, and each sector having a plurality of data segments (in which useful data is recorded) interspersed with servo areas. A periodic reference pattern is generated, the reference pattern being repeated in each of n blocks and exhibiting distinct amplitude values. The n blocks of reference pattern are recorded at a predetermined location in each sector; preferably, at the beginning of each sector. The recorded reference pattern is recorded in some of the data segments and, thus, is interrupted by servo areas.

As a feature of the present invention, when producing threshold levels from the sampled reference pattern, the samples are averaged, thereby reducing undue influence that may otherwise be attributed to spurious samples.

BRIEF DESCRIPTION OF THE DRAWINGS

The following detailed description, given by example and not intended to limit the present invention solely thereto, will best be understood in conjunction with the accompanying drawings in which:

FIGS. 4A–4C represent the format of the access code recorded in the address segments on the disk;

DETAILED DESCRIPTION OF PREFERRED EMBODIMENTS

Figure 1:
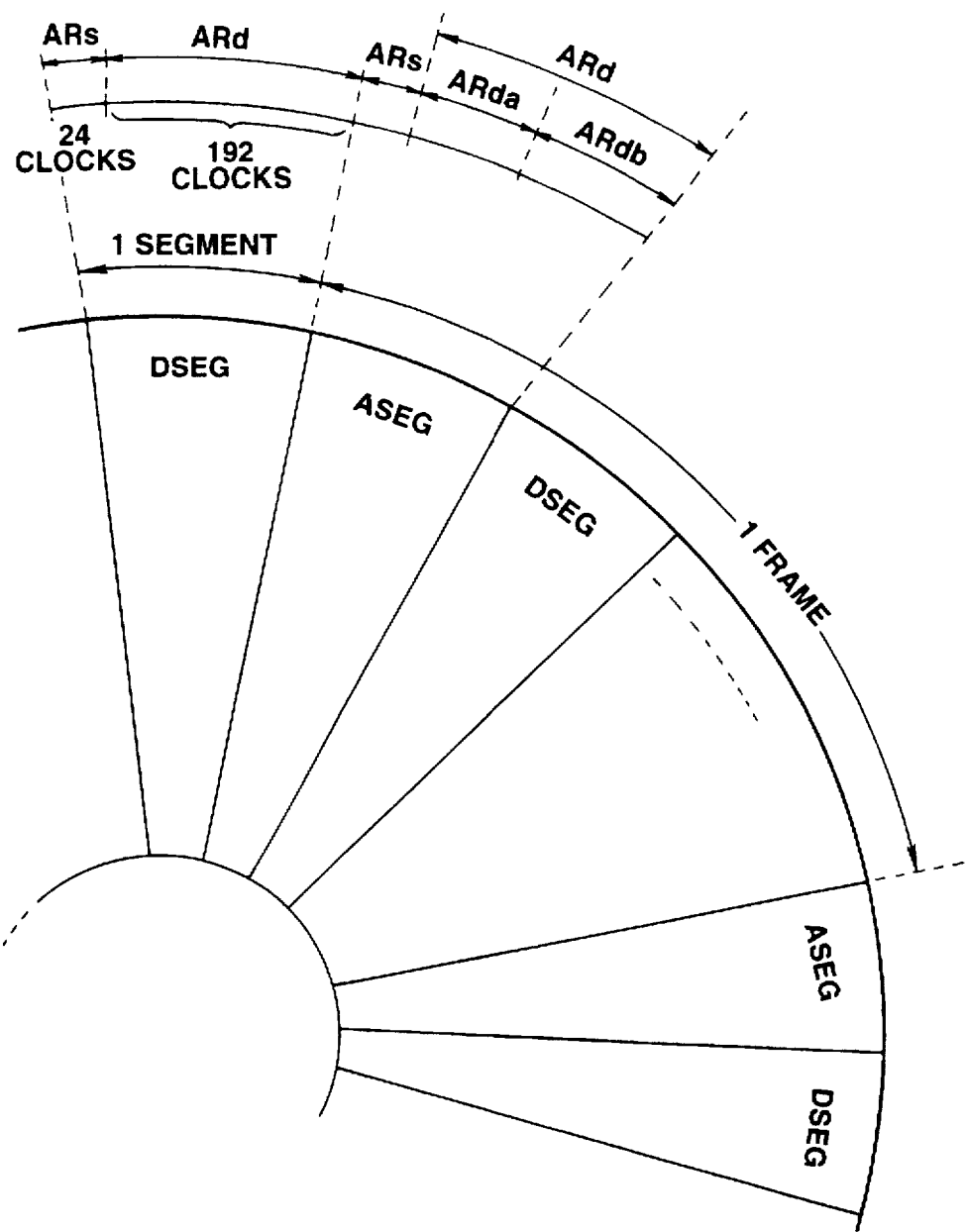
FIG. 1 is a schematic representation of a portion of a magneto-optical disk.
Figure 2:
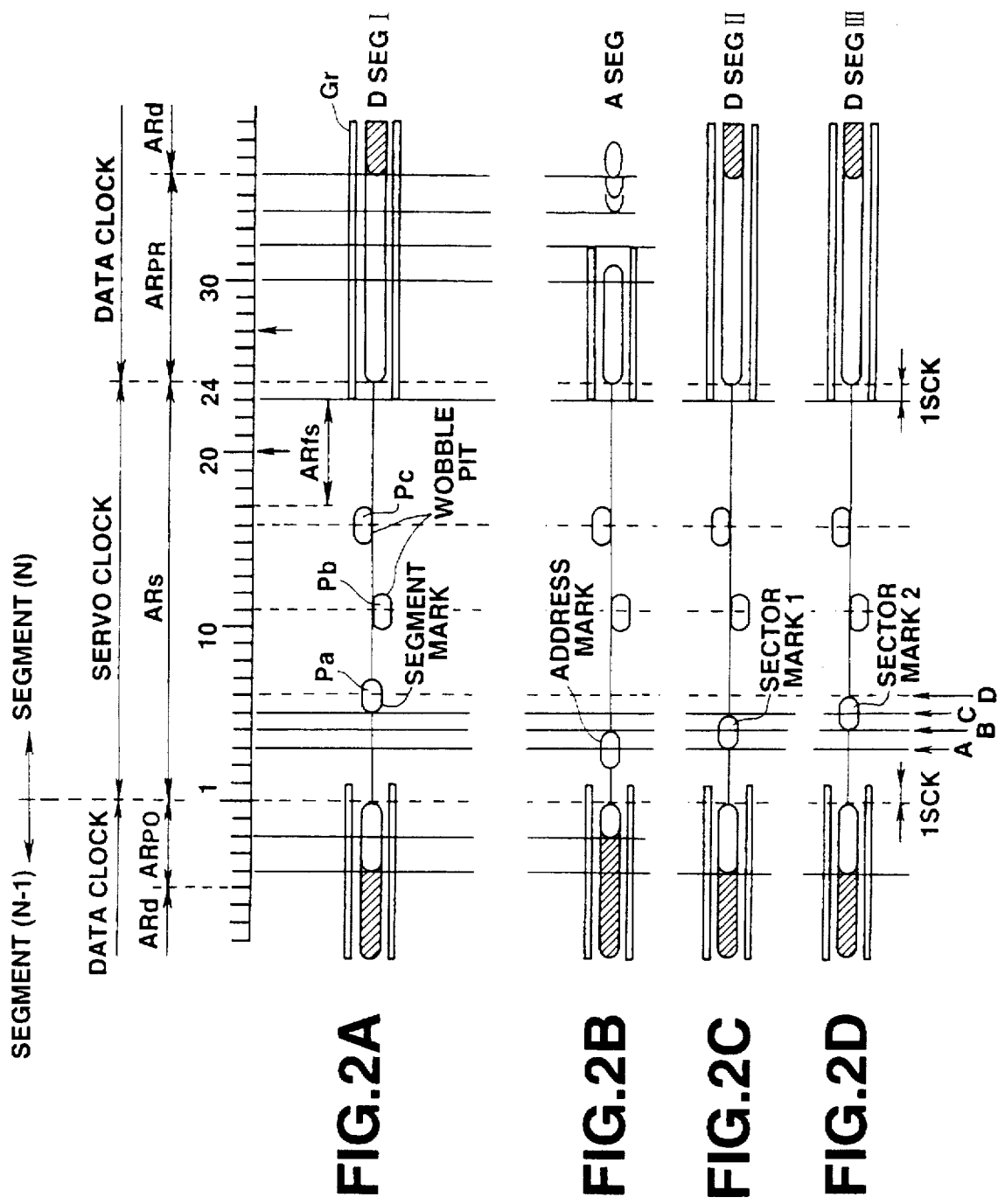
FIGS. 2A–2D are schematic representations of the format in which pits are recorded in the servo area of each segment recorded on the disk.

Referring now to the drawings, and in particular to FIG. 1, there is illustrated a portion of a track on the magneto-optical disk with which the present invention finds particular application. The portion of the track shown in FIG. 1 may be a portion of a spiral track recorded continuously from an inner radius to an outer radius or, alternatively, it may be a portion of one of several concentric tracks. It will be appreciated that the present invention is not contingent on whether a spiral track or continuous tracks are recorded on the disk. To account for the use of one spiral track or several concentric tracks, the description herein refers to a "turn" which is intended to mean one complete concentric track or one 360° rotation of a spiral track.

One turn is divided into 1400 segments, which are identified as address segments (ASEG) and data segments (DSEG), as shown in FIG. 1. Each address segment contains information (it is appreciated that in the magneto-optical disk, information is recorded as pits) which identifies the radial position of the address segment and also the circular position thereof. The data segments include useful data, such as audio information (if the magneto-optical disk is an audio disk), video information (if the magneto-optical disk is a video disk) or computer file information (if the magneto-optical disk is a computer storage medium). A frame is composed of 1 address segment and 13 data segments; and there are 100 frames recorded in a complete turn. Thus, each turn consists of 100 address segments and 1,300 data segments.

Figure 7:
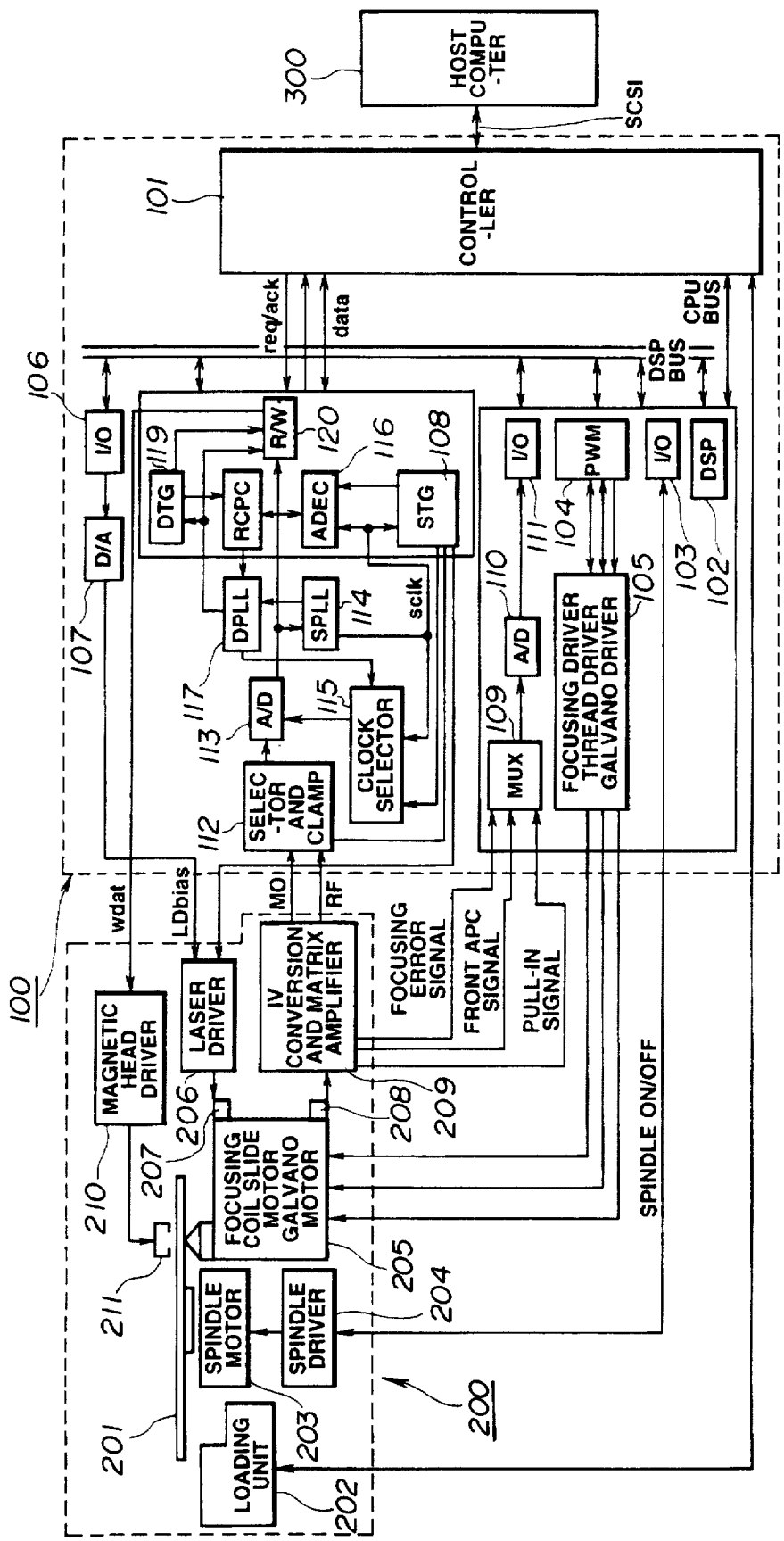
FIG. 7 is a block diagram of a magneto-optical disk drive in which the present invention finds ready application.

Typically, a unit of data is recorded as a pit; and as will be seen from FIGS. 2A–2D, the duration of each pit is approximately two clock cycles, with a clock cycle being generated by a reference clock (or system clock) in the disk drive, as shown in FIG. 7.

Each segment, whether an address segment or a data segment, is comprised of 216 clock cycles and each segment contains a servo portion (or area) ARs having a duration of 24 clock cycles and a data portion ARd having a duration of 192 clock cycles. The data portion of the address segment ASEG includes an address section ARda which contains address information and a laser control section ARdb which is used by the disk drive components shown in FIG. 7 to control various operating parameters of the laser beam used to scan the magneto-optical disk.

The format of the servo portion (or area) ARs of the address segment and of the different types of data segments is shown in FIGS. 2A–2D. Each servo portion (or area) contains three pre-recorded pits, identified as a mark pit $P_A$ and wobble pits $P_B$ and $P_C$. The positions of the wobble pits are fixed and the position of the mark pit is dependent upon the particular type of segment in which that mark pit is recorded. Referring first to the wobble pits $P_B$ and $P_C$, these pits are located at clock cycles 11 and 16 and are offset from the center line of the track by, for example, ¼ of a track pitch, as shown in FIGS. 2A–2D. These wobble pits are used for tracking control. It is appreciated that if the scanning laser beam is offset, or displaced, from the center line of the track, the signal produced from one of the wobble pits $P_B$ or $P_C$ will be greater than the other. Thus, an indication of the direction and intensity of a tracking error is produced and may be readily compensated. In addition, since the positions of the wobble pits $P_B$ and $P_C$ are fixed, pulses produced by scanning these pits will exhibit a frequency determined by the speed of the disk, thereby permitting a servo clock (from which system clock pulses are generated) to be synchronized therewith.

As shown in FIGS. 2A–2D, each servo portion in each segment includes a section ARfs in which no pits are recorded. This section is known as a focus sample section having a duration of six clock cycles and is used to control the focusing servo operation of the disk drive.

The format of the pits shown in FIGS. 2A–2D is preferred because it minimizes that portion of the disk in which no pits are formed (known as the mirror portion), thereby reducing the possibility that "ghost pits" will be produced during the disk molding process. It is preferred, therefore, to record each pit with a duration of two clock cycles and to separate the pits in the servo portion by at least five clock cycles. Consequently, inter-pit interference may be kept desirably small.

Figure 3:
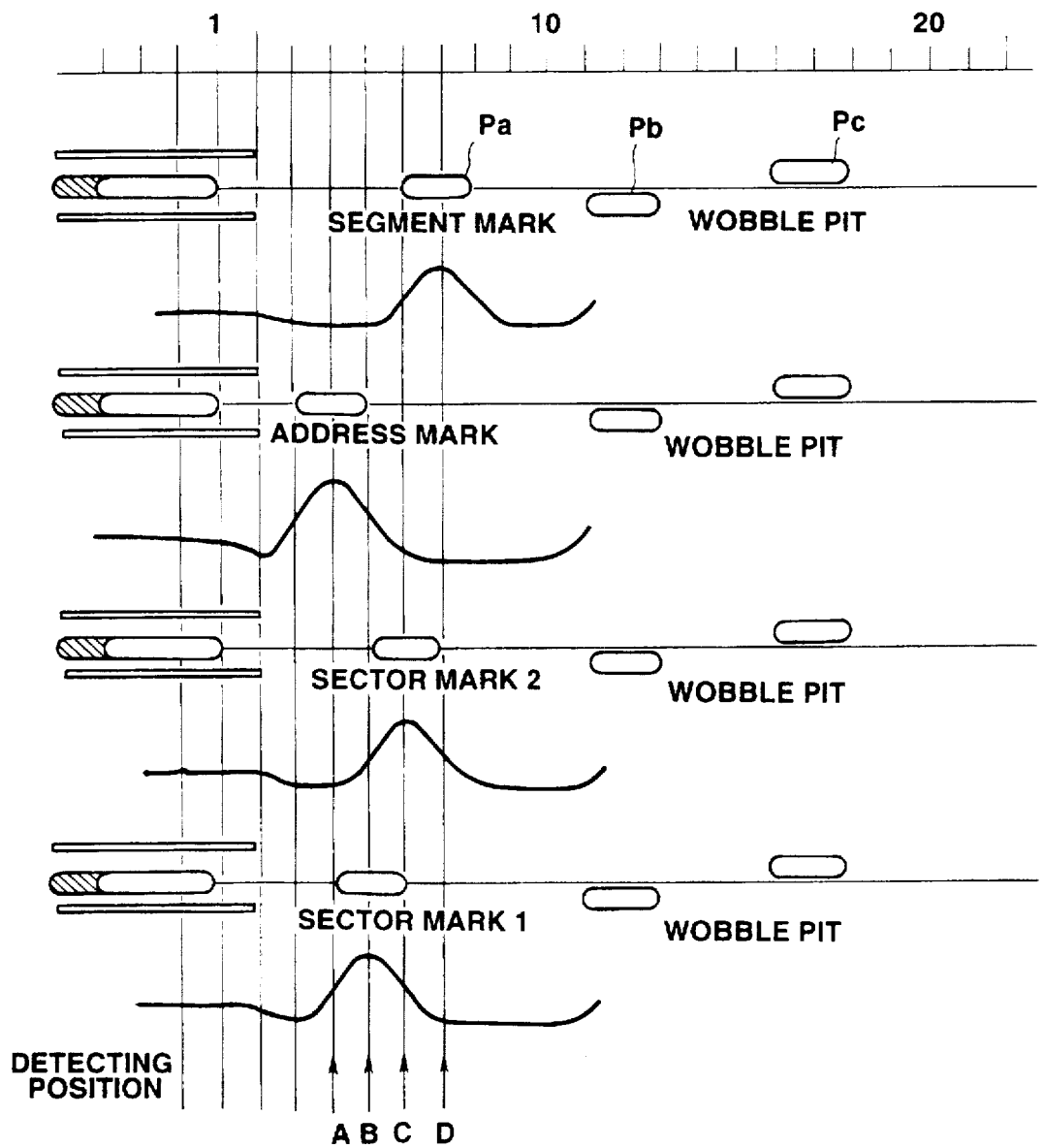
FIG. 3 is a schematic representation of the manner in which the "mark" pits in the servo area are detected.

Mark pit $P_A$, recorded in the leading section of each servo portion, identifies the segment in which the mark pit is recorded as either an address segment ASEG or a data segment DSEG. If a data segment, the position of the mark pit $P_A$ also identifies the data segment as the first data segment in a sector, the last data segment in the sector or any other intermediate data segment in the sector. The number of segments in a sector is dependent upon the radial position of that sector. As also shown in FIG. 3, if the mark pit is recorded in clock cycles 3–4 of a segment, that pit identifies the segment as an address segment ASEG. If the mark pit is located at clock cycles 4–5, the pit identifies the segment as a data segment, and moreover, as the leading, or first, data segment in the sector. If the mark pit $P_A$ is located at clock cycles 5–6, the pit identifies the segment as the last data segment of a sector. Finally, if the mark pit $P_A$ is located at clock cycles 6–7, the pit identifies the segment as any data segment, other than the first or last, in the sector. The presence and position of a mark pit are determined by generating sampling pulses at those clock cycles identified as A, B, C and D, shown in FIG. 3. Thus, if a mark pit $P_A$ is sensed by sampling pulse A, the segment in which that mark pit is located is identified as an address segment. If the mark pit is sensed by sampling pulse B, the segment is detected as the first segment of a sector. If the mark pit is sensed by sampling pulse C, the segment is detected as the last segment of a sector. And if the mark pit is sensed by sampling pulse D, the segment is detected as any intermediate segment in the sector.

It is appreciated that since the identify of a segment is readily determined simply by sensing the position of the mark pit $P_A$, it is not necessary to provide substantial segment identifying data which otherwise would detract from the amount of data that can be recorded in the data portion of each segment. As a result, the servo portion can be made smaller and information is recorded with higher efficiency.

FIGS. 4A–4C represent the information that is recorded in an address segment ASEG. The construction of the address information included in the data portion of the address segment is shown in FIG. 4B and includes an access code and a frame code. The access code includes a 16-bit track address formed of 4-bit groups AM, A2, A3 and AL together with a parity code P. This track address is recorded in Gray code and identifies the radial position of the address segment. The frame code identifies the frame address FM and FL, thereby identifying the frame in which the address segment is recorded; and as shown in FIG. 1, this identifies the circular position of that frame in a turn. The track and frame addresses are recorded in Gray code, as represented by FIG. 4C.

The access code is formed of 4-bit groups in which the 1's complement of each group is converted. The value of the 4-bit group AM is considered the most significant value or number (MSN) and the value of the 4-bit group AL is considered the least significant number (LSN). The 1's complement conversion is carried out in this order so that the access codes are changed by only one pattern across neighboring turns or tracks.

Similarly, the frame code is an 8-bit frame address formed of two 4-bit groups FM and FL. Here too, the frame code is recorded as Gray code information.

Figure 5:
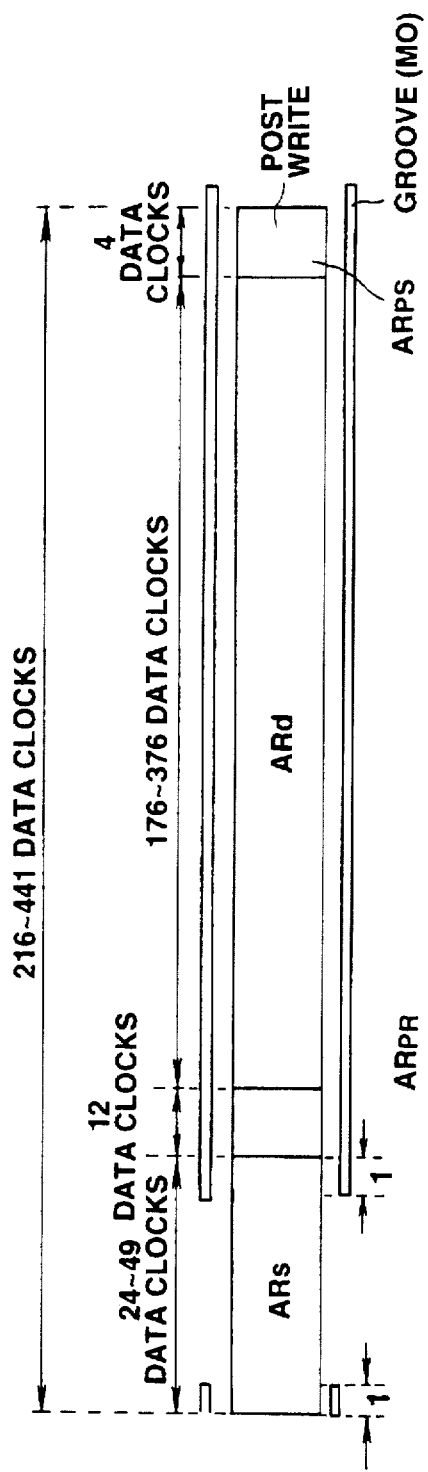
FIG. 5 represents the format of a data segment recorded on the disk.

As shown in FIG. 5, the data portion ARd of a data segment DSEG contains a variable amount of data and extends for 176 to 376 clock cycles, depending upon whether the data segment is recorded at an inner or outer radial position of the disk. The data portion is preceded by a pre-write area ARpr having a duration of 12 clock cycles, and is followed by a post-write area ARps having a duration of 4 clock cycles. The pre-write area ARpr is used during a recording operation as a clamp area for setting the necessary distance needed to pre-heat the disk until a stable temperature is reached from laser radiation. This pre-write area also suppresses DC variation due to, for example, double refraction of the magneto-optic signals.

The post-write area ARps provides a buffer section which avoids or at least minimizes interference from the end of one segment to the beginning of another. Also, in the event that old data is overwritten by new data, this buffer section accommodates a small excess of the new data.

Figure 6A:
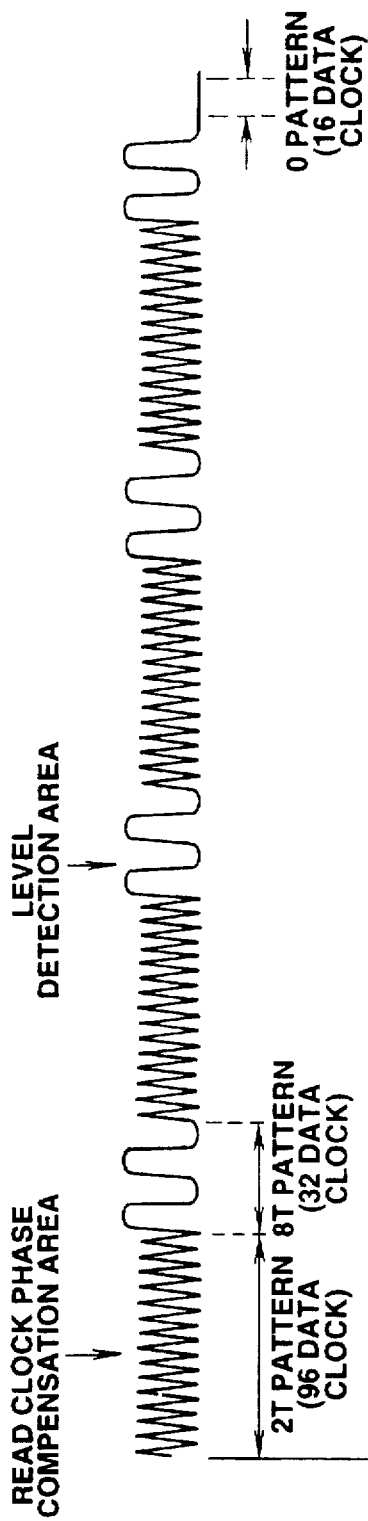
FIGS. 6A and 6B represent the periodic reference pattern that is recorded in each sector on the disk.
Figure 6B:
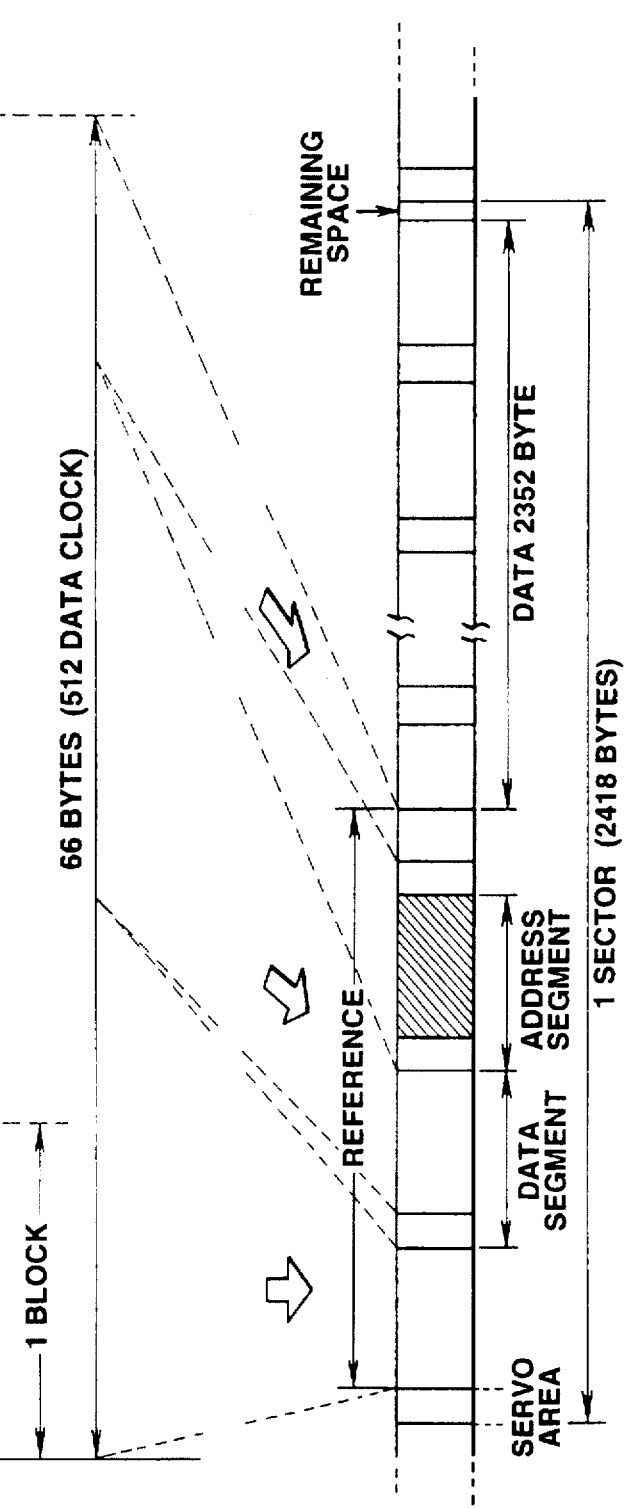

In a preferred embodiment of the magneto-optical disk recording format, a sector is comprised of 2,418 bytes having the particular construction shown in FIG. 6B. The sector includes 2,048 bytes of user data (i.e., data that may be recorded by the user or data that is of interest to the user, such as audio, video or computer data), plus 66 bytes of the reference pattern shown in FIG. 6A, plus 256 bytes of an error correcting code (ECC) plus 8 bytes of a cyclical redundancy code (CRC), plus 8 bytes of vendor data plus 32 bytes of data that may be recorded as the user sees fit, also referred to as user defined data. Interspersed within the sector of 2,418 bytes are periodic servo areas, shown in FIG. 6B, each servo area being pre-recorded with the magneto-optical disk to provide the wobble pits discussed above. It will be appreciated that each byte exhibits a duration of 8 clock cycles (a clock cycle also is referred to herein as a data clock); and it is seen that a segment, whether it is a data segment or an address segment, extends from the beginning of one servo area to the beginning of the next. It is also seen that each address segment ASEG is pre-recorded with the magneto-optical disk; and user data is interrupted by the pre-recorded servo areas.

It is a feature of the present invention to record a reference pattern at the beginning portion of each sector. The reference pattern is shown in FIG. 6A and is comprised of 64 bytes (or 512 clock cycles) of a repetitive reference pattern plus two bytes (or 16 clock cycles) of what is shown as a "0" pattern. From FIG. 1 it is seen that each servo area is comprised of 24 clock cycles and the immediately following data area is comprised of 192 clock cycles. The reference pattern, which is comprised of 528 clock cycles, thus is recorded in the data areas of the respective segments such that, for example, the first 192 clock cycles of the reference pattern are recorded following the first servo area and then the next 192 clock cycles are recorded after the next-following servo area and then, the remaining 144 clock cycles of the reference pattern are recorded after the following address segment and servo area. That is, the reference pattern is distributed into data segments; and it is seen that the last portion of the reference pattern fills only a portion of a data segment, the remainder of which contains useful data, as shown more clearly in FIG. 6B. Stated otherwise, the reference pattern is distributed over the leading segments of a data sector. It is appreciated that no portion of the reference pattern is recorded in the address segment shown in FIG. 6B because the address segment is pre-recorded throughout a turn, as discussed above in conjunction with FIG. 1.

Referring more particularly to the reference pattern shown in FIG. 6A, it is appreciated that this reference pattern is repeated in each of n blocks, wherein n=4 in the preferred embodiment. The reference pattern includes two distinct waveforms: a waveform identified as a "2T" pattern, wherein T is a clock cycle, and a waveform identified as the "8T" pattern. The "2T" pattern is represented as 110011001100 . . . and the "8T" pattern is represented as 1111111100000000011111111100 . . . . . The "2T" pattern is referred to as the read clock/phase compensation area and the "8T" pattern is referred to as the level detection area. In particular, the "8T" pattern exhibits two distinct amplitude levels, a minimum level and a maximum level, both of which are sampled and used to derive threshold levels against which the signals recovered from the recorded pits are compared to detect the value of such signals and, thus, to interpret the pits as 0's and 1's. The "2T" pattern exhibits a substantially higher frequency (four times the frequency of the "8T" pattern) and is used to detect phase shifts due to changes in the rotary speed of the disk and also to synchronize with the disk rotation the clock signals generated by the disk drive. As is clear from FIG. 6A, the reference pattern is repeated n times in the reference area of the data sector.

As will be described below, the reference pattern in each of the n blocks is sampled and is used to produce high (H), low (L) and mid (M) threshold levels.

A block diagram of the disk drive used to record on and reproduce from the magneto-optical disk is shown in FIG. 7. More particularly, the disk drive is comprised of a drive section 200 and a control section 100. Commands and data are exchanged between the control section and the drive section; and data originates with and is destined for a host computer 300. Operations of the disk drive are controlled by a controller 101 which communicates with host computer 300 via a suitable interface, such as a SCSI interface. Controller 101 appends CRC and ECC codes to data originating with host computer 300 and intended to be recorded on, for example, disk 201 and also serves to detect such CRC and ECC codes from data that is reproduced from the disk in order to correct such reproduced data in the event that errors are present. The data thus corrected by controller 101 then is transmitted to the host computer.

A digital signal processor 102 is included in control section 100 and functions to process the commands received from controller 101 so as to control drive section 200, thereby regulating the rotary speed of disk 201, the operation of the laser head and the operation of the magnetic head in the recording and reproduction of data. For example, digital signal processor 201 transmits commands to a spindle driver 204 via an input/output (I/O) circuit 103 to control spindle motor 203 which rotates disk 201. If an MO disk, as an example, is loaded onto drive section 200 by a loading mechanism 202, digital signal processor 102 commands spindle driver 204 to drive spindle motor 203 such that the disk is brought up to proper operating speed. When this speed is reached, a suitable signal is supplied from spindle driver 204 via I/O circuit 103 to digital signal processor 102 indicating that the disk speed has been stabilized and that a read or write operation may begin. While the disk is brought up to proper speed, digital signal processor 102 controls pickup drive motors 205 to position the laser head either to the inner portion of disk 201 or to the outer portion thereof such that the laser beam is positioned outside the user information area. Motors 205 are controlled by a pulse width modulation (PWM) circuit 204 which, in turn, controls driver 105 to control the motors 205. While outside the useful information area, the laser optics are controlled to focus the laser beam and to adjust the power thereof. It is preferred to carry out these operations outside the useful information area to avoid unintentional erasure or distortion of previously recorded data by the laser beam. At this time, the bias current of laser diode 207 is set by laser driver 206 in response to the control signal LDbias supplied thereto from digital signal processor 102 via an input/output (I/O) circuit 106 and digital-to-analog (D/A) converter 107. The digital signal processor also controls a (servo timing generator (STG) 108 via the DSP bus to control the laser driver to turn on laser diode 207 at the proper times.

The laser beam emitted by the laser diode is reflected from disk 201 to a photodetector 208, the output of which is converted by a current-to-voltage (I/V) converter and matrix amplifier 209 to a voltage which represents the magnitude of the reflected laser beam. At this time, with the beam positioned at the inner or outer portion of disk 201, an automatic power control (APC) signal is produced by I/V converter 209 and supplied to a multiplexer 109 of control section 100. This automatic power control signal is referred to as a "front" APC signal and is supplied by multiplexer 109 to A/D converter 110 for conversion into digital form so as to be supplied, via an input/output (I/O) interface circuit 111 to digital signal processor 102. The intensity of the reflected laser beam thus is detected by the digital signal processor to control the bias current supplied to the laser diode, thereby maintaining the proper intensity of the laser beam.

I/V converter and amplifier 209 also generates a focusing error signal in response to the reflected laser beam picked up by detector 208; and this focusing error signal is supplied by multiplexer 109, A/D convertor 110 and I/O interface 111 to digital signal processor 102. The digital signal processor responds to this focusing error signal to determine if the laser beam emitted by laser diode 207 is properly focused on disk 201. If not, the focusing lens (or lenses) of the laser optics is adjusted to provide proper focusing. For example, a suitable control signal is supplied from digital signal processor 102 via the DSP bus to PWM circuit 104 which, in turn, controls focusing driver 105 to adjust the focus condition of the laser beam. When the beam is properly focused, that is, when the focus control servo loop which generates the focusing error signal has been stabilized, I/V converter and amplifier 209 produces an RF signal exhibiting a substantially constant amplitude. This RF signal is clamped to a suitable reference potential by selector and clamp circuit 112.

Control section 100 includes a clock generator (SPLL) 114, which may be designated a servo phase locked loop. Prior to the detection of the pits recorded in the servo portion of each segment, clock generator 114 is free running. Timing pulses are produced by frequency dividing the free running frequency of the clock generator by a pre-set divisor. Clock generator 114 controls a clock selector 115 to generate sampling pulses, or windows, at those times during which the wobble pits are expected, as discussed above in connection with FIGS. 2A–2D. If such wobble pit detection is confirmed a predetermined number of successive times, clock generator 114 is recognized as being phase-locked to disk 201.

Once the clock generator is synchronized with the rotary speed of disk 201, the mark pits shown in FIGS. 2A–2D and 3 are sensed in order to identify the particular segment being scanned by the laser beam. Clock generator 114 thus generates the sampling pulses, or windows, at positions A, B, C and D (as best seen in FIGS. 2A–2D and 3) in order to determine the position of the mark pit in each servo area. It is appreciated that when an address mark is detected, frame synchronization can be readily established and a suitable frame counter thus may be reset so as to be incremented with each succeeding address mark. Moreover, since each frame is comprised of 14 segments, once the frame counter is reset, it is used to generate the sampling pulse, or window, at position A after 14 segments have been counted, thereby maintaining synchronism with each address mark. Proper synchronism thus is effected between clock generator 114 and disk 201.

An address decoder 116 is synchronized with clock generator 114 to decode the access and frame codes included in each address segment, as shown in FIG. 4B. By detecting and decoding the Gray code which represents the particular address of each frame, the current position of the laser pickup is sensed. In one embodiment, the frame code that is reproduced from the address segment is compared to the frame count produced on a frame-by-frame basis by the frame counter; and the confirmation of the frame code with the frame count confirms synchronization.

Digital signal processor 102 also controls the radial movement of the laser head in response to the detection of the track address, or access code, picked up by the head. More particularly, the digital signal processor controls, via the DSP bus and PWM circuit 104, thread driver 105 which, in turn, drives slide motor 205 to shift the laser head to a target track. When the target track is reached, a tracking error derived from the wobble pits $P_B$ and $P_C$ recorded in the servo areas is sensed; and digital signal processor 102 responds to this tracking error to feed back a tracking control signal via PWM circuit 104 to galvano driver 105 to drive galvano motor 205. It is appreciated, then, that the slide motor provides a coarse adjustment to the laser head and the galvano motor provides a fine adjustment thereto. Thus, a desired track is rapidly accessed and tracked.

Preferably, magneto-optical disk 201 is driven with constant linear velocity (CLV) such that the density of the pits, that is, the density at which data is recorded, remains substantially constant notwithstanding changes in the radial position of the track in which the data is located. Consequently, the data clock rate increases when data is recorded/reproduced at greater radial positions. A data clock generator (DPLL) 117, designated a data phase locked loop, uses the clock pulses produced by clock generator 114 to generate such data clock pulses. This is achieved by multiplying the frequency, or repetition rate, of the clock pulses produced by clock generator 114 by the factor M/N, where the ratio M/N changes as a function of the radial position of the laser head. These data clock pulses are supplied to a timing generator 119 which supplies appropriate data clocks to a recording/reproducing circuit 120.

During a recording mode, recording/reproducing circuit 120 is supplied with data from host computer 300 to be recorded on disk 201. Preferably, the data to be recorded is scrambled (by a scrambling technique which forms no part of the present invention per se and is not further discussed herein) and then modulated as NRZI data. The NRZI data wdat is synchronized with the data clock generated by data clock generator 117 and supplied to a magnetic head driver 210 which drives magnetic head 211 for recording this data. Head 211 generates a magnetic field in response to the modulated data wdat and applies this magnetic field to the data portion ARd of the segment being recorded on disk 201. During the recording mode, the disk is superheated to the Curie temperature by the laser beam emitted by laser diode 207, and in the environment of the magnetic field results in the recording of the data signal wdat. Also, and prior to the recording of the data signal in the data portion ARd of the segment, the reference pattern shown in FIG. 6A is supplied to magnetic head driver 210 for recording in the leading segments of a sector, as shown in FIG. 6B. Thus, the repetitive reference pattern formed of alternating 2T and 8T waveforms, repeated n times, is recorded at the beginning of each sector. As is apparent from FIG. 6B, the recording of this reference pattern is interrupted when the presence of a servo area is reached, thereby preventing overwriting of the servo areas.

Figure 8A:
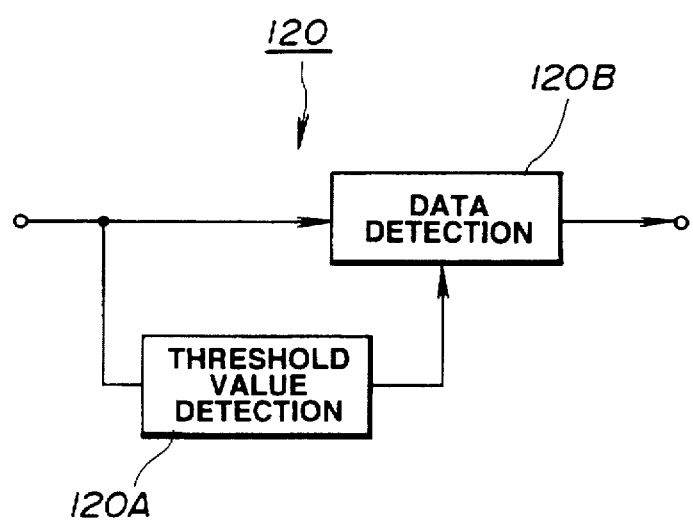
FIG. 8A is a block diagram of the data detecting section which incorporates the present invention and which may be used in the disk drive shown in FIG. 7.

When the pit pattern recorded on the magneto-optical disk is played back, the information supplied to recording/reproducing circuit 120 from I/V converter and amplifier 209, selector and clamp circuit 112 and A/D converter 113 must be interpreted to determine whether the reproduced signal is a "1" or a "0". The recording/reproducing circuit is shown in FIG. 8A as including a threshold value detector 120A and a data detector 120B which serve to digitally filter the signals reproduced from the magneto-optical disk consistent with a partial response (1,1). NRZI signals are produced by data detector 120B by viterbi decoding. The NRZI data then is converted to NRZ data; and since this data originally was scrambled it now is descrambled to recover the original data that had been recorded. The recovered data is supplied via controller 101 to host computer 300.

For effective partial response decoding, 3 threshold levels are used, namely a center threshold level and upper and lower threshold levels. Likewise, for viterbi decoding, 3 threshold levels are used; and these may be similar to but not necessarily identical to the threshold levels used for partial response decoding. See, for example, U.S. Pat. No. 5,363,352. Threshold detector 120A operates to establish two threshold levels, namely an upper threshold located between high and mid levels, and a lower threshold located between mid and low levels. Once these two threshold values are obtained, a third threshold level (which is the average thereof) may be readily produced, thereby resulting in the three threshold levels which are preferred for partial response and viterbi decoding. As will now be described, threshold detector 120A utilizes the lower and upper amplitude levels of the 8T waveform of the reference pattern (also identified as the level detection area) shown in FIG. 6A. Since this reference pattern is distributed in a small number of data segments located in the leading position of each sector, as shown in FIG. 6B, the threshold detector operates to establish the proper threshold levels before useful data from the sector is reproduced.

Figure 8B:
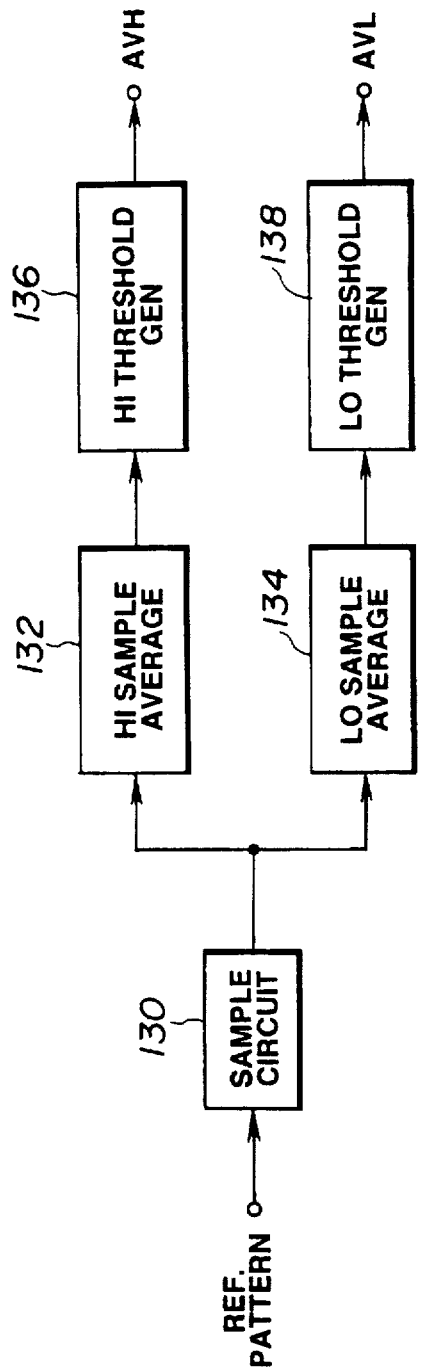
FIGS. 8B–8E are block diagrams representing various features of the present invention.
Figure 9:
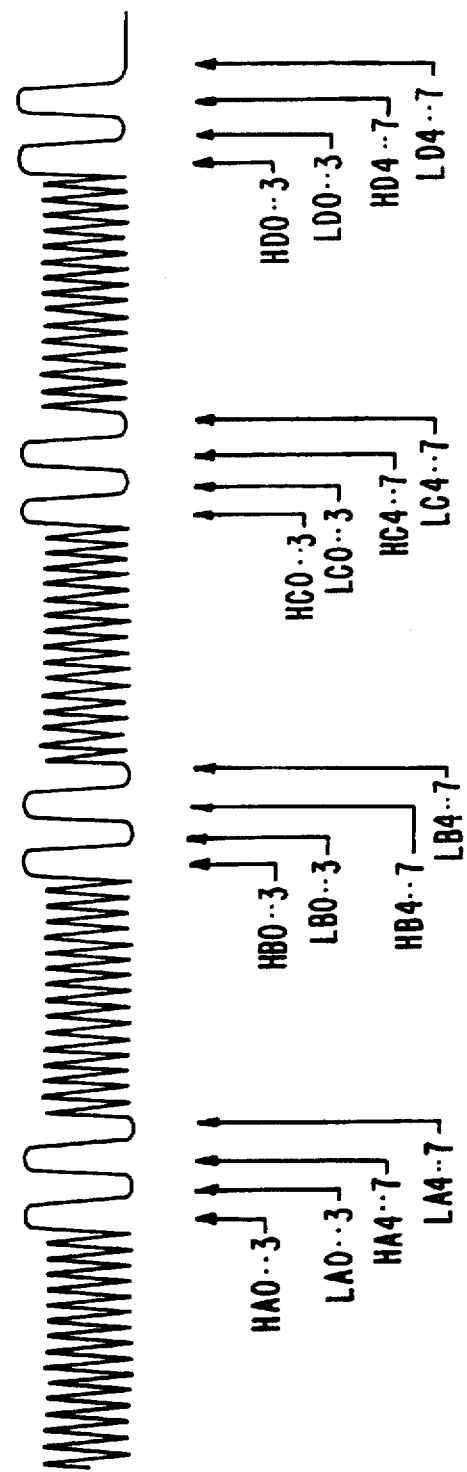
FIG. 9 is a schematic representation of the manner in which the reference pattern is sampled to derive threshold levels by the threshold detector shown in FIG. 8A.

Threshold detector 120A includes a sampling circuit 130 (shown in FIG. 8B) which samples the 8T waveform at those sampling points illustrated in FIG. 9. For example, in the first block of the reference pattern (referred to as block A), samples of the high amplitude level are produced at sampling times HA0, HA1, HA2 and HA3. Similarly in block A, samples of the low amplitude level of the reference pattern are obtained at sampling times LA0, LA1, LA2 and LA3. Then, since this 8T pattern repeats, high amplitude levels are sampled at sampling times HA4, HA5, HA6 and HA7; and low amplitude levels are sampled at sampling times LA4, LA5, LA6 and LA7. It is seen from FIG. 9 that similar high amplitude level and low amplitude level samples are obtained in the next block (block B) of the reference pattern as samples HB0–HB3, LB0–LB3, HB4–HB7, LB4–LB7. In similar fashion, the high amplitude levels and low amplitude levels in block C and in block D are obtained at those sampling times represented in FIG. 9.

Although the high amplitude and low amplitude levels are sampled 4 times during each period of the 8T pattern, it is appreciated that any number of samples $\underline{a}$ may be produced. Likewise, although the reference pattern is shown to repeat in each of 4 blocks, the reference pattern may repeat in each of n blocks.

The 4 low amplitude samples obtained in each of blocks A, B, C and D are averaged over each block in low sample averaging circuit 134 (FIG. 8B). Thus, the 4 low amplitude samples LA0–LA3 are averaged to produce the averaged low level sample for block A as:

$$AVla = \frac{1}{4} \sum_{n=0}^{3} LAn \qquad (1)$$

Likewise, the low level samples produced from block B are averaged to produce the averaged low level sample for block B as:

$$AVlb = \frac{1}{4} \sum_{n=0}^{3} LBn \qquad (2)$$

In similar fashion, the low level samples produced in each of blocks C and D are averaged to produce, for the respective blocks, the averaged low level samples:

$$AVlc = \frac{1}{4} \sum_{n=0}^{3} LCn \qquad (3)$$

$$AVld = \frac{1}{4} \sum_{n=0}^{3} LDn \qquad (4)$$

In similar fashion, for each block A, B, C and D, the high level samples are averaged to produce the averaged high level samples:

$$AVha = \frac{1}{4} \sum_{n=0}^{3} HAn \quad (5)$$

$$AVhb = \frac{1}{4} \sum_{n=0}^{3} HBn \quad (6)$$

$$AVhc = \frac{1}{4} \sum_{n=0}^{3} HCn \quad (7)$$

$$AVhd = \frac{1}{4} \sum_{n=0}^{3} HDn \quad (8)$$

Although equations (1)–(8) use only the first 4 high level and low level samples in each block to produced the averaged high level and low level samples, it would be appreciated that, if desired, all 8 of the high level samples in each block and all 8 of the low level samples may be averaged to produce the averaged high and low level samples for that block. It is further appreciated that threshold detector 120A may include the illustrated sampling and averaging circuitry or algorithms to produce these averaged level samples.

Figure 8C:
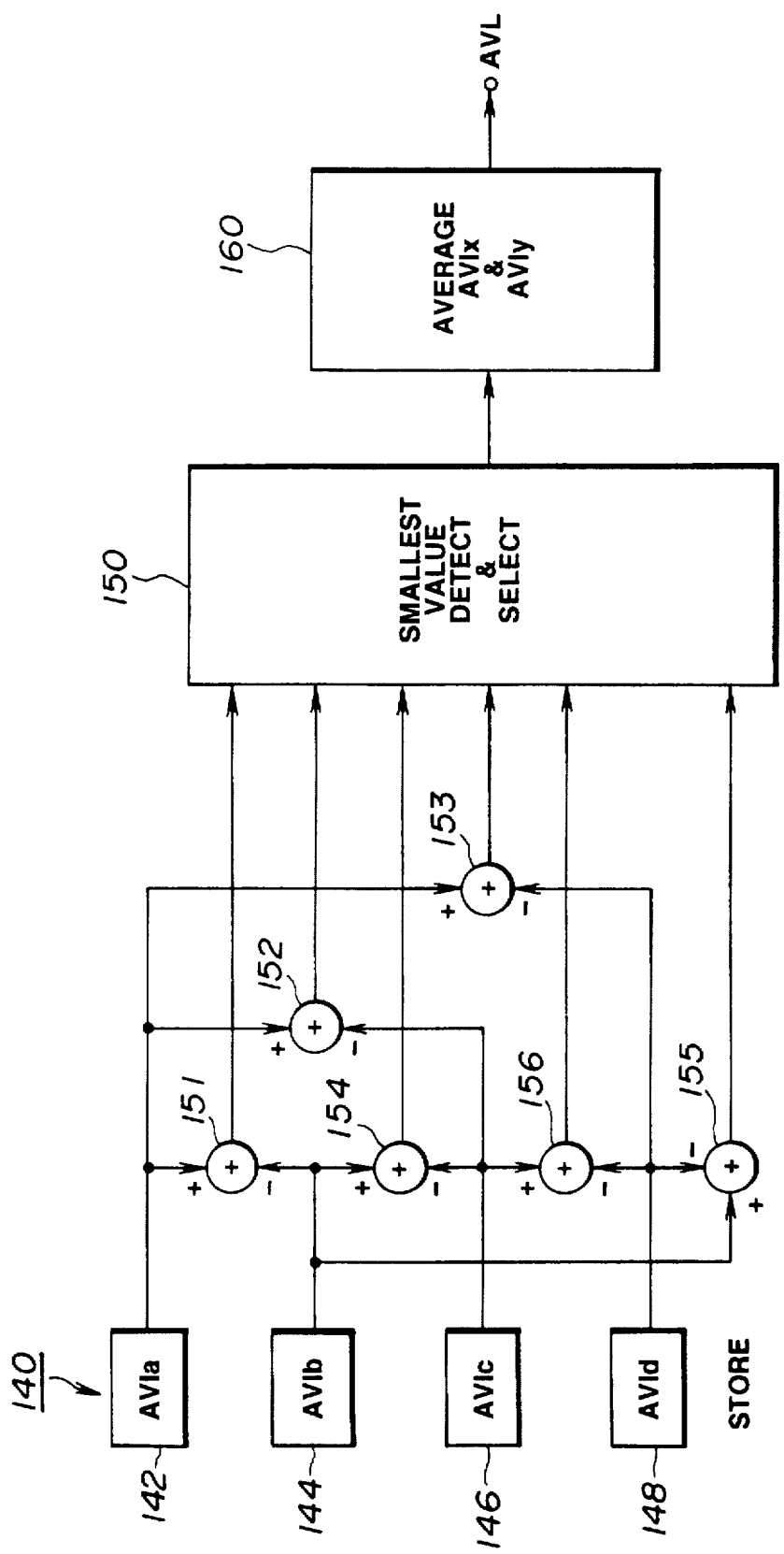

The averaged high level and low level samples obtained in the foregoing manner then are processed by high and low threshold level generators 136 and 138 to produce upper and lower threshold levels against which the signals that are reproduced from the scanned pits are compared in order to determine whether those signals are 1's or 0's. The present invention proposes various techniques for processing the averaged high and low level samples. As one feature of this invention, and as depicted in FIG. 8C, the 2 blocks whose low level samples exhibit the smallest difference therebetween are selected and the averaged low level samples of those 2 blocks are further averaged to produce an averaged level AVL. Similarly, the 2 blocks whose averaged high level samples exhibit the smallest difference therebetween are selected and the averaged high level samples of those blocks are further averaged to produce the high level AVH. For example, the difference between the averaged low level samples of block A, stored in AVla store 142, and the averaged low level samples of block B, stored in AVlb store 144, is determined by subtractor 151. Using the averaged low level samples represented by equations (1) and (2), this difference may be expressed as:

$$Alab = ABS(AVla - AVlb) \quad (9)$$

where Alab is produced by subtractor 151 and represents the difference between the averaged low level samples of blocks A and B; and ABS is the absolute value. Similarly, the difference between the averaged low level samples of blocks A and C is obtained by subtractor 152, and this difference is expressed as:

$$Alac = ABS(AVla - AVlc) \quad (10)$$

In similar fashion, the difference between the averaged low level samples of blocks A and D, blocks B and C, blocks B and D and blocks C and D are obtained by subtractors 153, 154, 155 and 156 and these differences may be expressed as:

$$Alad = ABS(AVla - AVld) \quad (11)$$

$$Albc = ABS(Avlb - Avlc) \quad (12)$$

$$Albd = ABS(AVlb - AVld) \quad (13)$$

$$Alcd = ABS(AVlc - AVld) \quad (14)$$

Then, the smallest difference value is determined by detector 150 which senses which of Alab, Alac, Alad, Albc, Albd and Alcd exhibits the minimum value. The averaged low level samples of the 2 blocks x and y (where x, y=a, b, c or d) which produced this minimum difference value are selected and are further averaged by averaging circuit 160 to produce the low level AVL. For example, if Alab is determined by detector/selector 150 to be the smallest difference value, then AVL=(AVla+AVlb)/2. If Alac is determined to exhibit the minimum difference value, then AVL=(AVla+AVlc)/2. In general, therefore, if Alxy is determined to exhibit the minimum difference value, then AVL=(AVlx+AVly)/2.

Without repeating the foregoing discussion, it will be appreciated that the high level AVH may be determine in a very similar manner from the averaged high level samples AVha, AVhb, AVhc and AVhd.

Figure 8D:
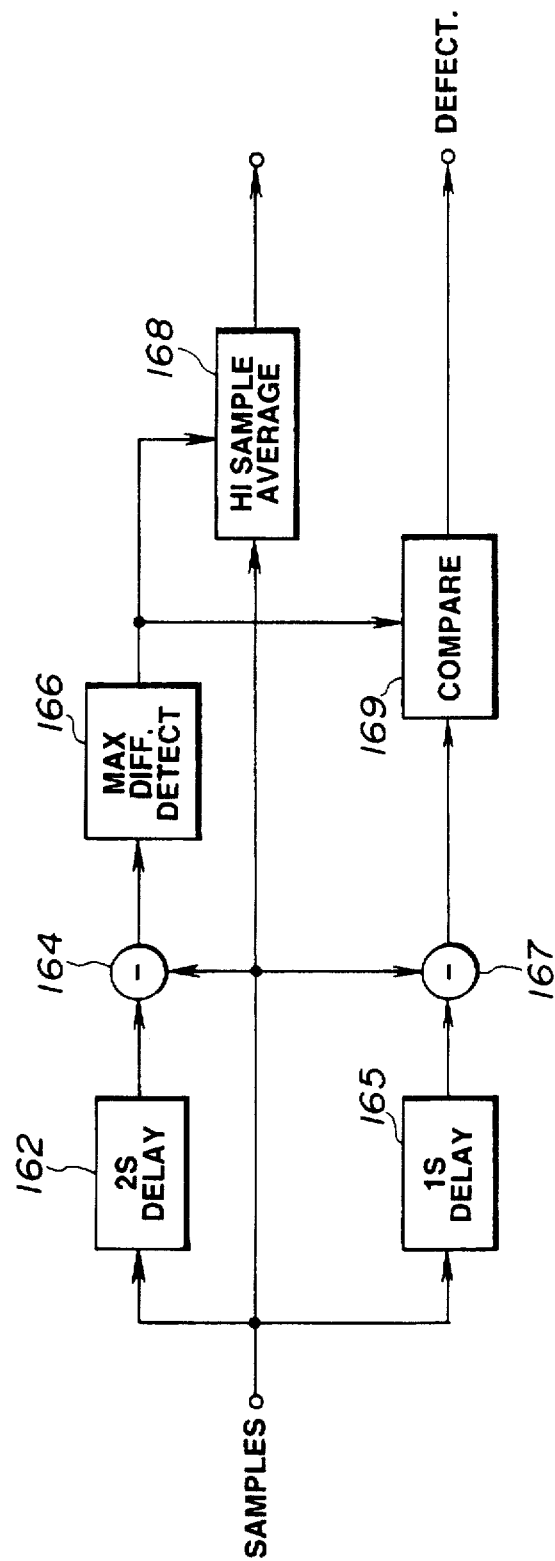

In accordance with another aspect of the present invention, the maximum and minimum high level samples in a block are excluded from the averaged high level samples in that block and, similarly, the low level samples exhibiting the highest and lowest levels are excluded from the averaged low level samples in that block. This is intended to prevent specious or aberrant samples from unduly influencing the average. Such aberrant samples are detected by the apparatus depicted in FIG. 8D as follows:

A transition in the reference pattern, and particularly the transition from the 2T pattern, is sensed in order to detect aberrant high level samples. Similarly, a negative transition in the 8T is pattern is sensed in order to detect aberrant low level samples. The following discussion is directed to sensing the positive transition in the reference pattern; and it will be readily understood that this same discussion is equally applicable when sensing the negative transition.

Figure 10:
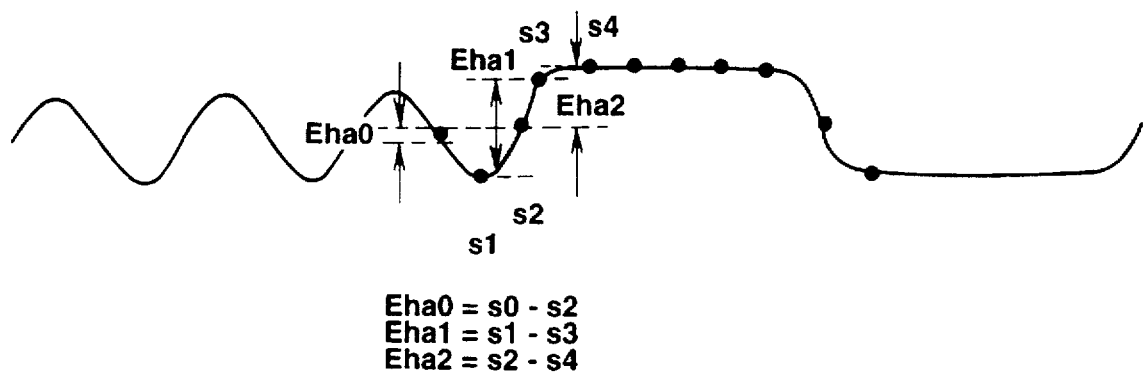
FIG. 10 is a waveform representation of the manner in which a transition in the reference pattern is detected from the samples thereof.

As shown in FIG. 10, samples of the reference pattern are obtained at sampling times s0, s1, s2, s3 and s4. Differences between every other sample are produced by subtractor 164 by subtracting the presently received sample from the sample delayed by 2s, that is, the second preceding sample, to produce:

$$Eha0 = s0 - s2 \quad (15)$$

$$Eha1 = s1 - s3 \quad (16)$$

$$Eha2 = s2 - s4 \quad (17)$$

It will be appreciated that the expression Eha represents the difference between every other sample in block A.

The largest difference value is sensed by maximum difference detector 166, which may be thought of as a peak detector, and the sample having the highest level which produces this largest difference value is determined to be the last sample in the positive transition. In the example shown in FIG. 10, the difference value Eha1 is sensed as the largest difference value; and sample s3 is determine to be the last sample in the positive transition. Then, averaging circuit 168 is enabled such that the a samples of the high level which are averaged are selected to be those a samples which follow by a predetermined number of samples, the last sample in the positive transition, namely sample s3. In the present example, the a high level samples which are averaged are spaced from sample s3 by one sample, namely sample s4. That is, once sample s3 is detected as being the last sample in the positive transition, the next-following sample s4 is skipped and then averaging circuit 168 is enabled to average the immediately succeeding a samples of the high level.

A similar operation is carried out to detect the negative transition in the 8T pattern. After the last sample in the negative transition is sensed, the next-following sample is skipped and then the immediately succeeding a samples of the low level of the reference pattern are averaged. Thus, samples HA0–HA3, LA0–LA3, HA4–HA7, LA4–LA7, etc. are obtained; and the average of the a high level samples as well as the average of the a low level samples in each block are produced.

Figure 11:
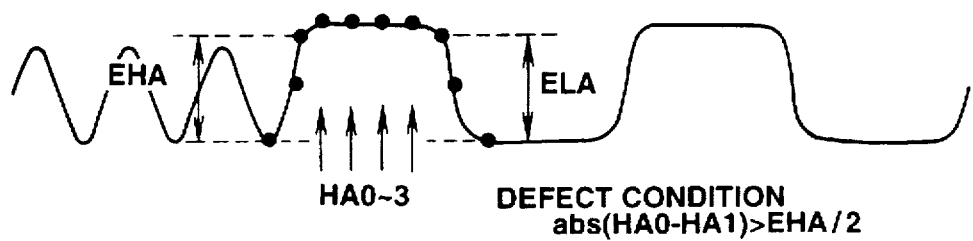
FIG. 11 is a waveform representation of the manner in which samples of the reference pattern are used to detect a defect.

The maximum difference value which is produced by detector 166 in detecting a positive transition also is used to sense the presence of a defect in the reference pattern. Let it be assumed that the maximum difference value is represented as EHA. The manner in which a defect is sensed now will be described in conjunction with the block diagram of FIG. 8D and the waveform shown in FIG. 11.

It will be appreciated that EHA is determined by subtractor 164 which senses the difference between each sample and a next adjacent sample (a sample delayed by 2s), that is the difference between every other sample; and by detector 166 which senses which of the thus-produced differences is the greatest. In the example discussed above, EHA=Eha1= s1–s3. Now, a defect is determined by sensing the difference between successive samples following the positive transition, namely the difference between samples HA0 and HA1, HA1 and HA2, and HA2 and HA3. Subtractor 167 is supplied with the present sample and the adjacent sample delayed by is to produce the differences between respectively adjacent samples. Comparator 169 determines if one of these differences exceeds a predetermined proportion of EHA supplied thereto by detector 166. If so, a defect is indicated. For example, if HA1–HA2>EHA/2, a defect is indicated. Similarly, if HA0–HA1>EHA/2; or if HA2–HA3>EHA/2, a defect is indicated. As a result the averaged high level samples obtained for this block (e.g. for block A), are not used in determining the upper threshold level. A similar process is carried out following a negative transition to sense a defect that may be present in the low level samples. For example, the maximum difference between every other sample may be determined as ELA, which also represents the negative transition in the reference pattern; and if the difference between successive samples exceeds ELA/2 (or any other desired proportion of ELA), a defect is indicated.

As yet a further aspect of this invention, when determining the averaged low level samples (as well as the averaged high level samples), the 4 averaged low level samples represented by equations (1)–(4) are themselves averaged. In accordance with one averaging technique, the averaged low level sample AVla, AVlb, AVlc or AVld which exhibits the largest value is excluded, as is the averaged low level sample that exhibits the lowest value. The remaining two averaged low level samples are themselves averaged to produce the low level AVL. A similar process obtains in determining the high level AVH. FIG. 8C may be readily modified to implement this aspect of the invention; and it will be appreciated that an equivalent algorithm may be used to carry out the foregoing processing so as to result in the low level AVL and the high level AVH.

Figure 8E:
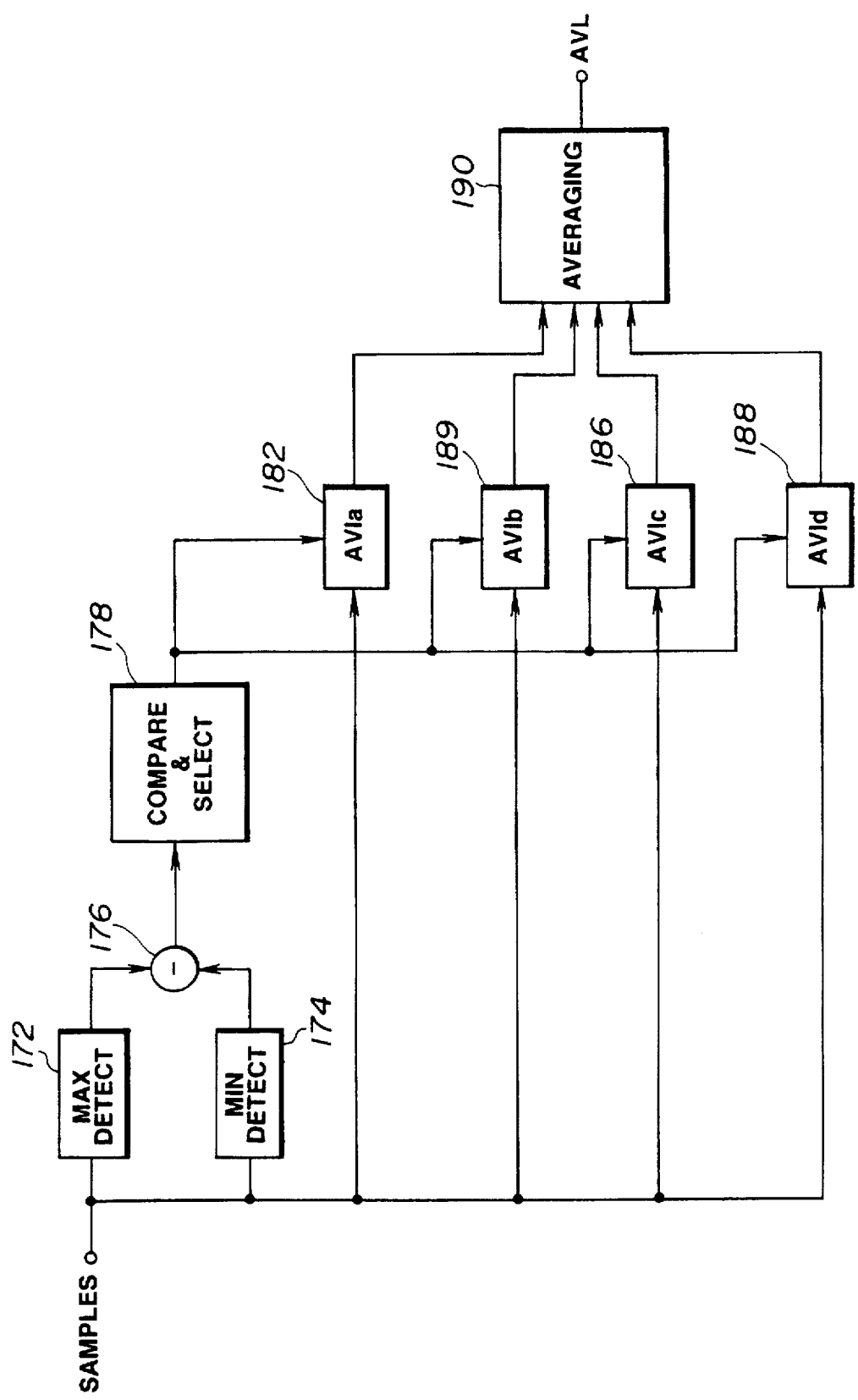

As yet another aspect of this invention, and as depicted in FIG. 8E, only those low level (or high level) samples in a block exhibiting the smallest distribution of sample levels are averaged. That is, the distribution of the low level samples in each of blocks A, B, C and D are compared to identify those blocks whose distributions are the highest; and the low level samples produced by such identified blocks are excluded from the averaging operation. Similarly, the distribution of the high level samples obtained in blocks A, B, C and D are compared; and those blocks whose distributions are the highest are excluded from the averaging operation. For example, and as may be described generally, the b blocks whose low level samples exhibit distributions having the smallest values are selected, and the low level samples of those blocks are averaged in order to derive therefrom the lower threshold level.

The distribution of the samples in a block may be readily determined as follows: referring to the low level samples LA0–LA3 in block A, the maximum and minimum values of the samples are detected as BA1max and BA1min by maximum detector 172 and minimum detector 174, respectively. The distribution WA1 of the low level samples in block A is determined by subtractor 176 and may be represented as WA1=BA1max–BA1min. Likewise, the distribution of the low level samples in blocks B, C and D may be obtained by detectors 172, 174 and subtractor 176 and represented as WB1, WC1 and WD1. The a-b blocks (for example, the 2 blocks) whose distributions are the highest are sensed by comparator 178 which compares the distributions WA1, WB1, WC1 and WD1 to each other, and these blocks are excluded from the sample averaging operation. If, for example, distributions WA1 and WC1 are determined to exhibit the highest values, then blocks A and C are excluded from the averaging operation and the low level samples LB0–LB3 and LD0–LD3 are selected by comparator 178 for use in deriving the lower threshold level. As one example, and as shown in FIG. 8E, the averaging operation may be obtained, consistent with the foregoing assumption by averaging the low level samples of block B, thereby producing the averaged low level sample AVlb; and the low level samples of block D likewise may be averaged to produce the averaged low level sample AVld. These averaged low level samples are stored in memories 184 and 188 and are further averaged by averaging circuit 190 to produce the low level AVL=(AVlb+AVld)/2.

In a similar manner, the distribution of those blocks of high level samples may be determined; and the particular blocks exhibiting the greatest distribution are excluded. Then, the high level samples of those blocks having the smallest distributions are averaged; and the resultant averaged high level samples for those blocks are further averaged to produce the high level AVH. This may be expressed as AVH=(AVhx+AVhy)/2 where "x" and "y" are the averaged high level samples from those blocks A, B, C or D which exhibit the smallest distributions.

As a feature of this invention, the threshold levels against which the reproduced data is compared preferably are a center level CEN, an upper threshold level TH and a lower threshold level TL. These three threshold levels are derived from the high level AVH and the low level AVL which are produced in the manner discussed above. The three threshold levels CEN, TH and TL are used for viterbi decoding.

In addition, the center threshold level CEN and upper and lower thresholds SH and SL (wherein SH and SL are not equal to TH and TL) are derived from the high and low levels AVH and AVL for use in partial response (1,1) decoding. These threshold levels may be produced by simple arithmetic operations on the high level and low level values as follows:

$$CEN=(AVH+AVL)/2 \tag{18}$$

$$TH=CEN+(AVH-AVL)/4 \tag{19}$$

$$TL=CEN-(AVH-AVL)/4 \tag{20}$$

$$SH=(AVH-AVL)/2 \tag{21}$$

$$SL=(AVL-AVH)/2 \tag{22}$$

It will be recognized that threshold detector 120A may include suitable arithmetic processing circuits, or arithmetic processing algorithms, to implement these equations. In the interest of brevity, such arithmetic processing circuits are not illustrated.

Figures 12A, 12B:
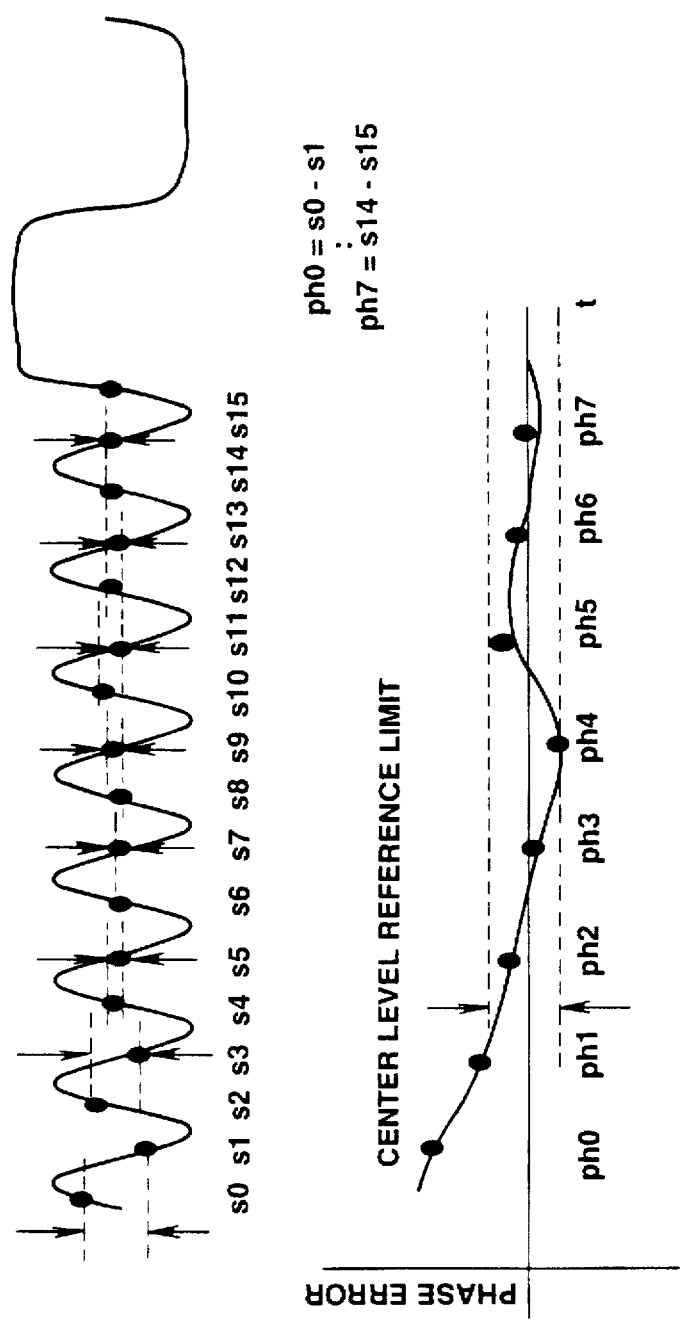
FIGS. 12A and 12B are waveform representations of the manner in which a center threshold level may be produced directly from samples of the reference pattern in accordance with an aspect of the present invention.

Although the center threshold level CEN may be obtained in the manner discussed above and represented by equation (18), another embodiment by which the center threshold level may be produced now will be described in conjunction with FIGS. 12A and 12B. FIG. 12A illustrates the 2T pattern followed by the 8T pattern in the reference pattern. FIG. 12A further illustrates sampling times s0, s1, s2, ... s15 as may be generated by, for example, clock 114 of FIG. 7. Desirably, the sampling pulses produced at these sampling times occur at the zero or center level of the waveform derived from reproducing the 2T pattern. However, because of phase shifts or phase errors, as may be due to lack of precise synchronism between the rotation of disk 201 and clock 114, some of these sampling times may not coincide with the center or zero level of the 2T waveform. This is best shown as sampling times s0, s1, s2 and s3 in FIG. 12A. It is appreciated, therefore, that if the absolute values of those samples of the 2T waveform which are too large are excluded from a sample averaging operation, that is, if those sample levels which fall outside a predetermined center range are excluded, the average of the remaining samples will produce an accurate representation of the center level threshold CEN. Stated otherwise, since samples of the 2T waveform vary in the positive and negative direction about the zero level, as is seen from FIG. 12A, the center threshold level CEN may be produced simply by summing those samples which fall within the desired range (CEN=Σsn).

The desired range within which the samples of the 2T waveform are used is determined by sensing a phase error ph represented by the difference between successive samples. For example, an initial phase error ph0 is determined by detecting the difference between samples s0 and s1: ph0= s0−s1. Similarly, the next phase error phi is determined by detecting the difference between samples s2 and s3: ph1= s2−s3. This operation is repeated for the remaining samples; and the resultant phase errors are depicted graphically in FIG. 12B. The desired range of acceptable phase errors may be arbitrary and is represented by the broken lines in FIG. 12B. Those samples which produce phase errors within this range are summed or averaged, as the case may be, to produce the center level threshold CEN. For example, a circuit arrangement comprised of a 1s delay circuit, a subtractor and a comparator similar to delay circuit 165, subtractor 167 and comparator 169 of FIG. 8D may sense the acceptable range; and the output of the comparator may enable a summing circuit or an averaging circuit to sum or average samples s4, s5, s6, ... to produce the center level threshold CEN.

While the present invention has been particularly shown and described with reference to preferred aspects, it will be appreciated that various modifications and changes may be made without departing from the spirit and scope of the invention. For example, in the numerical examples discussed above, the preferred embodiments show n=4, a=4 and b=2. However, other numerical examples may be selected for n, a and b. The appended claims are, therefore, intended to cover the preferred embodiments described, those alternatives which have been mentioned or suggested, and all equivalents.

What is claimed is:

1. A method of reproducing data from a magneto-optical disk, said data being recorded in a track which contains a reference pattern repeated in each of n blocks, the reference pattern of a block having a clock pattern and also having a level detection pattern which includes high and low amplitude levels in each block, and from which plural threshold levels are derived to detect reproduced data values, said method comprising the steps of: sampling said high level $a$ times in each block, sampling said low level $a$ times in each block, averaging the $a$ high level samples in each block to produce n averaged high level samples, deriving a high threshold value from at least some of the n averaged high level samples, averaging the $a$ low level samples in each block to produce n averaged low level samples, deriving a low threshold value from at least some of the n averaged low level samples, and using the high and low threshold values to discriminate the value of the reproduced data.

2. The method of claim 1 wherein n>2; and wherein the step of deriving a high threshold value comprises determining the difference between the averaged high level samples of every 2 blocks, identifying the 2 blocks having the smallest differences between their averaged high level samples, and averaging the averaged high level samples of the identified 2 blocks to derive said high threshold value.

3. The method of claim 1 wherein n>2; and wherein the step of deriving a low threshold value comprises determining the difference between the averaged low level samples of every 2 blocks, identifying the 2 blocks having the smallest difference between their averaged low level samples, and averaging the averaged low level samples of the identified 2 blocks to derive said low threshold value.

4. The method of claim 1 wherein $a$>2; and wherein the step of deriving a high threshold value comprises excluding from the high level samples that are averaged in each block, the sample exhibiting the highest level and the sample exhibiting the lowest level.

5. The method of claim 1 wherein $a$>2; and wherein the step of deriving a low threshold value comprises excluding from the low level samples that are averaged in each block the sample exhibiting the highest level and the sample exhibiting the lowest level.

6. The method of claim 1, further comprising the step of detecting positive and negative transitions in the reference pattern in each block; and wherein the $a$ samples of said high level are obtained a predetermined number of samples following the detected positive transition and the $a$ samples of said low level are obtained said predetermined number of samples following the detected negative transition.

7. The method of claim 6 wherein each of said positive and negative transitions is detected by obtaining respective difference values between every other sample; sensing the largest of said difference values; and identifying as a transition the samples whose difference value is the largest.

8. The method of claim 1 wherein the step of deriving a high threshold value from at least some of the n averaged high level samples comprises identifying b blocks whose high level samples exhibit respective distributions having the b smallest values and averaging the high level samples of the identified b blocks to derive said high threshold level.

9. The method of claim 8 wherein the distribution of high level samples in a block is produced by obtaining a difference between the highest level of the $a$ high level samples in said block and the lowest level of said $a$ high level samples in said block; and wherein the b blocks exhibiting the b smallest value distributions are the b blocks having the smallest differences.

10. The method of claim 8 wherein the step of averaging the high level samples of the identified blocks comprises producing b averaged sample values by averaging the $a$ high level samples in each of the identified b blocks; and averaging said b averaged sample values to derive said high threshold level.

11. The method of claim 1 wherein the step of deriving a low threshold value from at least some of the n averaged low level samples comprises identifying b blocks whose low level samples exhibit respective distributions having the b smallest values and averaging the low level samples of the identified b blocks to derive said low threshold level.

12. The method of claim 11 wherein the distribution of low level samples in a block is produced by obtaining a difference between the highest level of the a low level samples in said block and the lowest level of said a low level samples in said block; and wherein the b blocks exhibiting the b smallest value distributions are the b blocks having the smallest differences.

13. The method of claim 11 wherein the step of averaging the low level samples of the identified blocks comprises producing b averaged sample values by averaging the a low level samples in each of the identified b blocks; and averaging said b averaged sample values to obtain said low threshold level.

14. The method of claim 11, further comprising the steps of determining the difference between each sample and a next adjacent sample, storing the determined difference whose value is the maximum of the determined differences, detecting the difference between each sample and an adjacent sample, sensing if a detected difference exceeds a predetermined proportion of the stored maximum difference, and indicating a defect if said detected difference exceeds said predetermined proportion of said stored maximum difference.

15. The method of claim 1, further comprising the steps of detecting a transition in said reference pattern in a block; obtaining the difference between maximum and minimum amplitude levels across said transition; sampling high amplitude levels following said transition; and indicating a defect if a fluctuation between successive samples of said high amplitude levels is greater than a predetermined proportion of said difference.

16. The method of claim 1 wherein said level detection pattern in each block includes a first periodic waveform exhibiting a first repetition rate and having said high and low amplitude levels and said clock pattern in each block exhibits a second repetition rate greater than said first repetition rate and subject to phase changes; and further comprising the step of sampling said clock pattern at sampling times which are expected to coincide with the crossing of a reference level by said clock pattern.

17. The method of claim 16, further comprising the step of averaging the clock pattern samples to produce a center threshold level to use for discriminating the reproduced data.

18. The method of claim 17 wherein the step of averaging the clock pattern samples comprises detecting respective differences between successive clock pattern samples, and averaging only those clock pattern samples which produce differences that are less than a pre-established amount.

19. A method of recording information in the form of pits in a track on a magneto-optical disk, said track containing plural sectors, each sector having a plurality of data segments in which data is recorded, interspersed with servo areas, said method comprising the steps of generating a reference pattern repeated in each of n blocks, the reference pattern of a block being comprised of a first periodic waveform exhibiting a first repetition rate and having distinct amplitude levels and a second periodic waveform exhibiting a second repetition rate greater than said first repetition rate; said first periodic waveform amplitude levels being used during a playback operation to derive threshold levels for detecting reproduced data values and said second periodic waveform being used during said playback operation to synchronize a clock generator with rotation of said disk; and recording said n blocks of said reference pattern at a predetermined location in each sector.

20. The method of claim 19 wherein the recorded reference pattern occupies plural data segments and is interrupted by a number of said servo areas.

21. The method of claim 20 wherein the recorded reference pattern is interrupted irregularly by said servo areas.

22. The method of claim 19 wherein said first and second periodic waveforms are arranged alternately as said reference pattern.

23. The method of claim 19 wherein said track is a concentric track on said disk.

24. The method of claim 19 wherein said track is a spiral track on said disk; and wherein said predetermined location comprises at least one location in each full turn of said disk.

25. An optical disk having patterns of data-representing pits recorded thereon in a track, said track containing plural sectors, each sector having a plurality of data segments in which data pits are recorded, interspersed with servo areas in which servo pits are recorded for tracking control and clock generation; and a reference pattern of pits being distributed in a number of data segments located in a leading position of each sector, said reference pattern being comprised of n repetitive blocks with each block of said reference pattern containing a first periodic waveform exhibiting a first repetition rate and, when played back, producing distinct amplitude levels; and a second periodic waveform exhibiting a second repetition rate greater than said first repetition rate and, when played back, operable to synchronize a clock generator with rotation of said disk said distinct amplitude levels being used, during a playback operation, to derive threshold levels for detecting data values of said data pits.

26. The optical disk of claim 25, wherein said reference pattern is interrupted irregularly by said servo areas.

27. The optical disk of claim 26 wherein said first and second waveforms are comprised of first and second repetitive patterns of pits arranged alternately to form said reference pattern.

28. The optical disk of claim 27 wherein said track is a concentric track on said disk.

29. The optical disk of claim 27 wherein said track is a spiral track on said disk.

30. Apparatus for reproducing data from a magneto-optical disk, said data being recorded in a track which contains a reference pattern repeated in each of n blocks, the reference pattern of a block having a clock pattern and also having a level detection pattern which includes high and low amplitude levels in each block and from which plural threshold levels are derived to detect reproduced data values, said apparatus comprising: high level sampling means for sampling said high level a times in each block, low level sampling means for sampling said low level a times in each block; high level averaging means for averaging the a high level samples in each block to produce n averaged low level samples and to derive a high threshold value from at least some of the n averaged high level samples, and low level averaging means for averaging the a low level samples in each block to produce n averaged low level samples and to derive a low threshold value from at least some of the n averaged low level samples; and means for using the derived high and low threshold values to detect said reproduced data values.

31. The apparatus of claim 30 wherein n>2; and wherein said high level averaging means includes means for determining the difference between the averaged high level samples of every 2 blocks, means for identifying the 2 blocks having the smallest differences between their averaged high level samples, and means for averaging the averaged high level samples of the identified 2 blocks to derive said high threshold value.

32. The apparatus of claim 30 wherein n>2; and wherein said low level averaging means includes means for determining the difference between the averaged low level samples of every 2 blocks, means for identifying the 2 blocks having the smallest difference between their averaged low level samples, and means for averaging the averaged low level samples of the identified 2 blocks to derive said low threshold value.

33. The apparatus of claim 30 wherein a>2; and wherein said high level averaging means includes means for sensing the high level samples exhibiting the highest and lowest levels, and means for excluding from the high level samples that are averaged in each block, the sample exhibiting the highest level and the sample exhibiting the lowest level.

34. The apparatus of claim 30 wherein a>2; and wherein said low level averaging means includes means for sensing the low level samples exhibiting the highest and lowest levels, and means for excluding from the low level samples that are averaged in each block the sample exhibiting the highest level and the sample exhibiting the lowest level.

35. The apparatus of claim 30, further comprising means for detecting positive and negative transitions in the reference pattern in each block; and wherein said sampling means is enabled to produce said a samples of said high level a predetermined number of samples following the detected positive transition and to produce said a samples of said low level said predetermined number of samples following the detected negative transition.

36. The apparatus of claim 35 wherein said means for detecting said positive and negative transitions comprises means for obtaining respective difference values between every other sample; means for sensing the largest of said difference values; and means for identifying as a transition the samples whose difference value is the largest.

37. The apparatus of claim 30 wherein said high level averaging means comprises means for sensing sample distribution in a block, means for identifying b blocks whose high level samples exhibit respective distributions having the b smallest values and means for averaging the high level samples of the identified blocks to derive said high threshold level.

38. The apparatus of claim 37 wherein the means for sensing sample distribution in a block includes means for obtaining a difference between the highest level of the a high level samples in a block and the lowest level of said a high level samples in said block; and wherein said means for identifying the b blocks exhibiting the b smallest value distributions comprises means for determining the b blocks having the smallest differences.

39. The apparatus of claim 37 wherein the means for averaging the high level samples of the identified blocks comprises means for averaging the a high level samples in each of the identified b blocks to produce b averaged sample values; and means for averaging said b averaged sample values to derive said high threshold level.

40. The apparatus of claim 30 wherein said low level averaging means comprises means for sensing sample distribution in a block, means for identifying b blocks whose low level samples exhibit respective distributions having the b smallest values and means for averaging the low level samples of the identified blocks to derive said low threshold level.

41. The apparatus of claim 40 wherein the means for sensing sample distribution in a block includes means for obtaining a difference between the highest level of the a low level samples in a block and the lowest level of said a low level samples in said block; and wherein said means for identifying the b blocks exhibiting the b smallest value distributions comprises means for determining the b blocks having the smallest differences.

42. The apparatus of claim 40 wherein the means for averaging the low level samples of the identified blocks comprises means for averaging the a low level samples in each of the identified b blocks to produce b averaged sample values; and means for averaging said b averaged sample values to obtain said low threshold level.

43. The apparatus of claim 30, further comprising means for determining the difference between each sample and a next adjacent sample, means for sensing and storing the determined difference whose value is a maximum, means for detecting the difference between each sample and an adjacent sample, means for sensing if a detected difference exceeds a predetermined proportion of the stored maximum difference, and means for indicating a defect if said detected difference exceeds said predetermined proportion of said stored maximum difference.

44. The apparatus of claim 30, further comprising means for detecting a transition in said reference pattern in a block; means for obtaining the difference between maximum and minimum amplitude levels across said transition; means for sampling high amplitude levels following said transition; and means for indicating a defect if a fluctuation between successive samples of said high amplitude levels is greater than a predetermined proportion of said difference.

45. The apparatus of claim 30 wherein said level detection pattern in each block includes a first periodic waveform exhibiting a first repetition rate and having said high and low amplitude levels and said clock pattern in each block exhibits a second repetition rate greater than said first repetition rate and subject to phase changes, and wherein said sampling means is operable to sample said clock pattern at sampling times which are expected to coincide with the crossing of a reference level by said clock pattern.

46. The apparatus of claim 45, further comprising means for averaging the clock pattern samples to produce a center threshold level to use for detecting the reproduced data.

47. The apparatus of claim 46 wherein said means for averaging the clock pattern samples comprises means for detecting respective differences between successive clock pattern samples, and means for averaging only those clock pattern samples which produce differences that are less than a pre-established amount.

* * * * *